United States Patent
Krantz et al.

(10) Patent No.: US 7,297,931 B2
(45) Date of Patent: Nov. 20, 2007

(54) METHOD AND APPARATUS TO EFFECTIVELY REDUCE A NON-ACTIVE DETECTION GAP OF AN OPTICAL SENSOR

(75) Inventors: Eric P. Krantz, Ithaca, NY (US); Douglas J. DeAngelis, Ipswitch, MA (US); Kirk Sigel, Ithaca, NY (US)

(73) Assignee: Lynx System Developers, Inc., Haverhill, MO (US)

( * ) Notice: Subject to any disclaimer, the term of this patent is extended or adjusted under 35 U.S.C. 154(b) by 148 days.

(21) Appl. No.: 10/690,237

(22) Filed: Oct. 20, 2003

(65) Prior Publication Data

US 2005/0082464 A1   Apr. 21, 2005

(51) Int. Cl.
*G01J 1/04* (2006.01)
*H01J 3/14* (2006.01)
*G02B 6/00* (2006.01)
*G02B 6/04* (2006.01)

(52) U.S. Cl. .............. 250/227.14; 250/227.11; 250/216; 385/12; 385/120

(58) Field of Classification Search ........ 358/482, 358/483, 484, 901.1; 385/113, 116, 120, 385/121, 12; 382/321; 348/359, 832; 250/216, 250/227.11, 227.14, 227.2
See application file for complete search history.

(56) References Cited

U.S. PATENT DOCUMENTS

| | | | |
|---|---|---|---|
| 4,189,207 A * | 2/1980 | Fisher et al. ............ 385/116 |
| 4,573,082 A | 2/1986 | Jeskey ................... 358/250 |
| 4,674,834 A | 6/1987 | Margolin ............... 350/96.25 |
| 4,748,680 A | 5/1988 | Margolin .................. 382/65 |
| 4,871,228 A | 10/1989 | Roos ..................... 350/96.25 |
| 4,896,965 A * | 1/1990 | Goff et al. .............. 356/417 |
| 4,904,049 A * | 2/1990 | Hegg ..................... 385/120 |
| 4,910,395 A * | 3/1990 | Frankel ................. 250/203.3 |
| 5,061,036 A * | 10/1991 | Gordon .................. 385/116 |
| 5,729,640 A | 3/1998 | Castonguay ............. 382/321 |
| 6,191,413 B1* | 2/2001 | Hegyi .................. 250/227.11 |
| 6,377,739 B1* | 4/2002 | Richardson et al. ...... 385/115 |
| 2004/0109653 A1* | 6/2004 | Kerr et al. .............. 385/120 |
| 2004/0178329 A1* | 9/2004 | Kare et al. ........... 250/227.11 |

\* cited by examiner

*Primary Examiner*—Georgia Epps
*Assistant Examiner*—Don Williams
(74) *Attorney, Agent, or Firm*—Lathrop & Gage LC

(57) ABSTRACT

An apparatus is provided to effectively reduce the non-active detection gap between sensor elements of an optical sensor. Reducing the non-active gap can subsequently reduce the time delay between sensor elements, mitigating the image degrading effects of a composite element time delay. While applicable to use with a wide range of optical sensors, the invention may be used for detecting aspects of a variable-rate dynamic colorful object using a matrix sensor or a tri-linear color CCD sensor. In one variation, optical fibers extend from a first fiber optic faceplate to a second fiber optic faceplate. The optical fibers can be oriented toward or directly mounted to the sensor elements. A spacer may be used to separate the optical fibers for alignment with the sensor elements and the other end of the optical fibers are attached to each other.

43 Claims, 8 Drawing Sheets

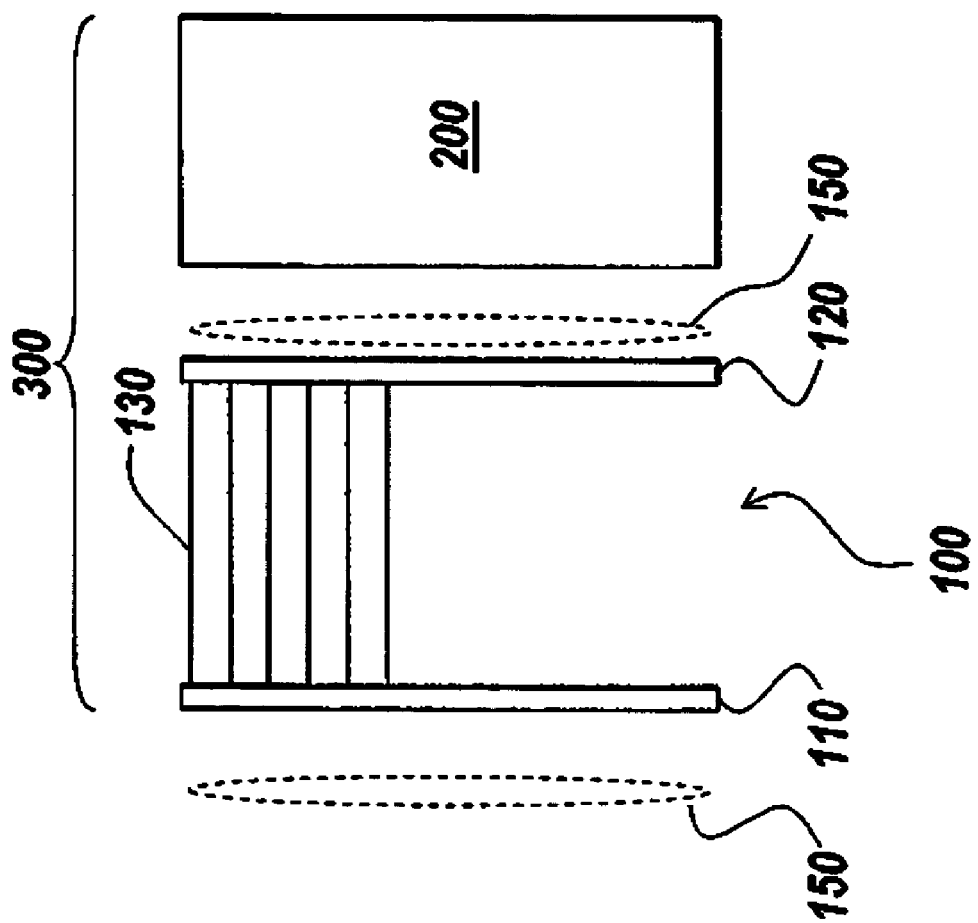
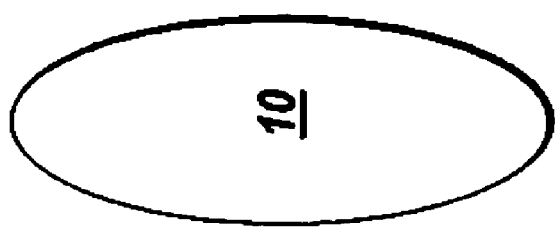
FIGURE 2

FIGURE 3A  FIGURE 3B

METHOD AND APPARATUS TO EFFECTIVELY REDUCE A NON-ACTIVE DETECTION GAP OF AN OPTICAL SENSOR

FIELD OF THE INVENTION

This invention relates to optical sensors and more specifically relates to methods and apparatus for redirecting light in order to effectively reduce a non-active detection gap between optical sensor elements of one or more optical sensors.

BACKGROUND OF THE INVENTION

Optical sensors are used for a wide variety of imaging purposes. An optical sensor, such as a linear sensor, may have multiple sensor elements, each of which captures a portion of the light information of an object or scene of interest. The manufacture of optical sensors may require a non-active gap between these sensor elements. The non-active gap is a portion of the optical sensor that can not detect an optical signal. In one example, linear arrays of distinct red, green and blue light capturing sensor elements are separated by a linear area, the non-active gap, where the combined sensor is not capable of capturing an optical signal.

Similarly, optical sensors with one optical sensor element may be used collectively with other such sensors to form a larger combined sensor. In such cases, non-active gaps will typically exist between the sensor elements of neighboring sensors.

For many applications that rely upon a predictable rate and distance of subject movement, such as, for example, a color imaging scanner, the size of a non-active gap does not create difficulty in the recording of subjects and subsequent accurate replay of images. However, for subjects that are dynamic or moving with unpredictable speed and/or distance relative to the sensor, this non-active gap can cause the inaccurate recording of an object or scene and result in a significant loss of image fidelity.

SUMMARY OF THE INVENTION

The present invention concerns methods of ameliorating the problems caused by non-active gaps. One example of an image sensor having separation between sensor elements, e.g. non-active gaps, is the three-color linear CCD detector that is used for various and extensive commercial purposes, including color scanners and machine vision. Typically, this optical sensor is constructed with significant non-active gaps between the linear red, green and blue element arrays. The presence of these non-active gaps may pose little difficulty in high fidelity imaging for many applications. Examples of this type of application include the detection of objects which move at a constant rate along a fixed focal plane and which themselves are not dynamically active, such as a sheet of paper along a scanner. Similarly, this includes examples where the object is stationary and the optical sensor moves at a constant rate along a fixed focal plane.

Dynamically active objects moving at variable rates pose a difficulty in high fidelity color imaging, particularly when a large depth-of-field is required. An example of such a situation is an optical line sensor used at the finish line of a race or other competition. In such a case, the separation of sensor elements results in an inaccurate representation of the events as the contestants cross the finish line. For instance, the color aspects of a competitor, such as the uniform, may be blurred in the image. This arises as the first sensor detects one color aspect of the uniform, for example, red, as the competitor crosses the line and the subsequent sensors in succession detect other color aspects, such as, for example, green then blue.

The non-active gap between color sensors therefore presents a time and space difference in real terms for red, green and blue color information intended to be recorded simultaneously. It may not be possible to accurately interpolate such information in the combined red, green and blue color image. This can cause an image to be blurred substantially, to the point where loss of image fidelity is responsible for the inability to determine the outcome of a competition, or even to determine the distinguishing characteristics of competitors.

The present invention addresses the difficulties of the prior art by the use of optical fibers oriented to obtain visual images from a field of view at one location and distribute components of the optical images to more widely-spaced sensor elements of one or more optical sensors.

This invention effectively reduces the non-active gap between sensor elements and thus reduces the time delay between such sensor elements in receiving image information, such as for example, the red, green and blue image components of a moving subject. The image fidelity is therefore improved because the combined image components present a closer match to the true image at an instantaneous moment or "snapshot" of interest. In other words, optical congruence may be enhanced by the use of the invention.

One implementation includes an optical sensor apparatus for effectively reducing a non-active gap. The optical sensor may have a first linear array of sensor segments and a second linear array of sensor segments separated by a first non-active gap having a first width. A first optical fiber has a first end oriented toward a field of view and a second end oriented toward a sensor segment of the first linear array of sensor segments. A second optical fiber has a first end oriented toward the field of view and located a first distance, less than the first width, from the first end of the first optical fiber and a second end oriented toward a sensor segment of the second linear array of sensor segments. This effectively reduces the distance between corresponding elements of the first and second linear arrays and therefore enhances the optical congruence of the first linear array in relation to the second linear array.

An optical sensor system for effectively reducing a non-active gap may have a tri-linear optical sensor with a first linear sensor element and a second linear sensor element separated by a first non-active gap with a first width. A third linear sensor element separated from the second linear sensor element by a second non-active gap having a second width can also be included. First, second and third optical fibers each have their first end oriented toward the field of view and the second end oriented toward the linear sensor elements. The second optical fiber is located a first distance, less than the first width, from the first end of the first optical fiber. The third optical fiber is located a third distance, less than the second width, from the first end of the second optical fiber.

An apparatus for effectively reducing a non-active gap of an optical sensor may include a first and second fiber optic faceplate each configured to accommodate a plurality of optical fibers. A first and second optical fibers of the plurality of optical fibers each have a first end mounted to the first fiber optic faceplate and a second end mounted to the second fiber optic faceplate. The first end of the second optical fiber is mounted to the first fiber optic faceplate a first distance, less than the non-active gap, from the first end of the first optical fiber, and the second end of the second optical fiber is mounted to the second fiber optic faceplate such that the second end of the first optical fiber and the second end of the second optical fiber are spaced to align with a first linear array and a second linear array, respectively, of a multiple-linear array image sensor.

The separation of the second ends of the optical fibers may involve at least one spacer for proper positioning. The apparatus for effectively reducing a non-active gap of an optical sensor may have a first optical fiber and a second optical fiber are mounted such that a first end of the each optical fiber is oriented toward the field of view and the second end is directed towards a sensor. A first spacer is mounted between the second end of the first optical fiber and the second end of the second optical fiber to locate the second ends further apart than the first ends so as to correspond to elements of an optical sensor.

The invention also provides a method of effectively reducing a non-active gap of an optical sensor. The optical sensor has a first linear sensor element and a second linear sensor element separated by a first non-active gap having a first width and a third linear sensor element separated from the second linear sensor element by a second non-active gap of a second width. A first end of each optical fiber is oriented toward the field of view and the second end of each optical fiber is oriented toward the first, second and third linear sensor elements, respectively. The first end of a second optical fiber is located a first distance, less than the first width, from the first end of the first optical fiber and the first end of a third optical fiber is located a third distance, less than the second width, from the first end of the second optical fiber. Using this method, the optical congruence of said linear sensors may be enhanced in relation to each other.

The apparatus effectively reduces a non-active gap of an optical sensor or sensors. The apparatus gathers light information at or near a field of view and directs the image information to at least two linear sensor elements of an optical sensor so as to improve the image fidelity of the subject by enhancing the optical congruence capability of the optical sensor at an instantaneous or "photographic" time of interest.

BRIEF DESCRIPTION OF THE DRAWING

FIG. 2 illustrates a side view of the optical sensor system of FIG. 1;

DETAILED DESCRIPTION OF THE INVENTION

The invention addresses the difficulties of the prior art by the use of optical fibers oriented to obtain visual images from a field of view and distribute components of the optical images to more widely-spaced sensor elements of one or more optical sensors. This can enhance the optical congruence of the image obtained through the more widely-spaced sensor elements and eliminate inaccuracies caused by non-active optical gaps in the sensors. The image fidelity of a subject can be improved at an instantaneous or "photographic" time of interest by reducing the potential image degrading effects between the sensor elements. Such image degrading effects can include a differential time delay, angular and/or positional differences between the sensor elements. Specifically, optical congruence is enhanced in that the image information received by each sensor element at any instantaneous time is a closer representation of the original subject field than it would be if the sensor elements received image information directly from the field of view without non-active gap mitigation. Thus, the invention compensates for the image degrading effects, more severe in dynamically moving objects, that arise from the ordinarily non-active gap between sensor elements.

Figure 1:
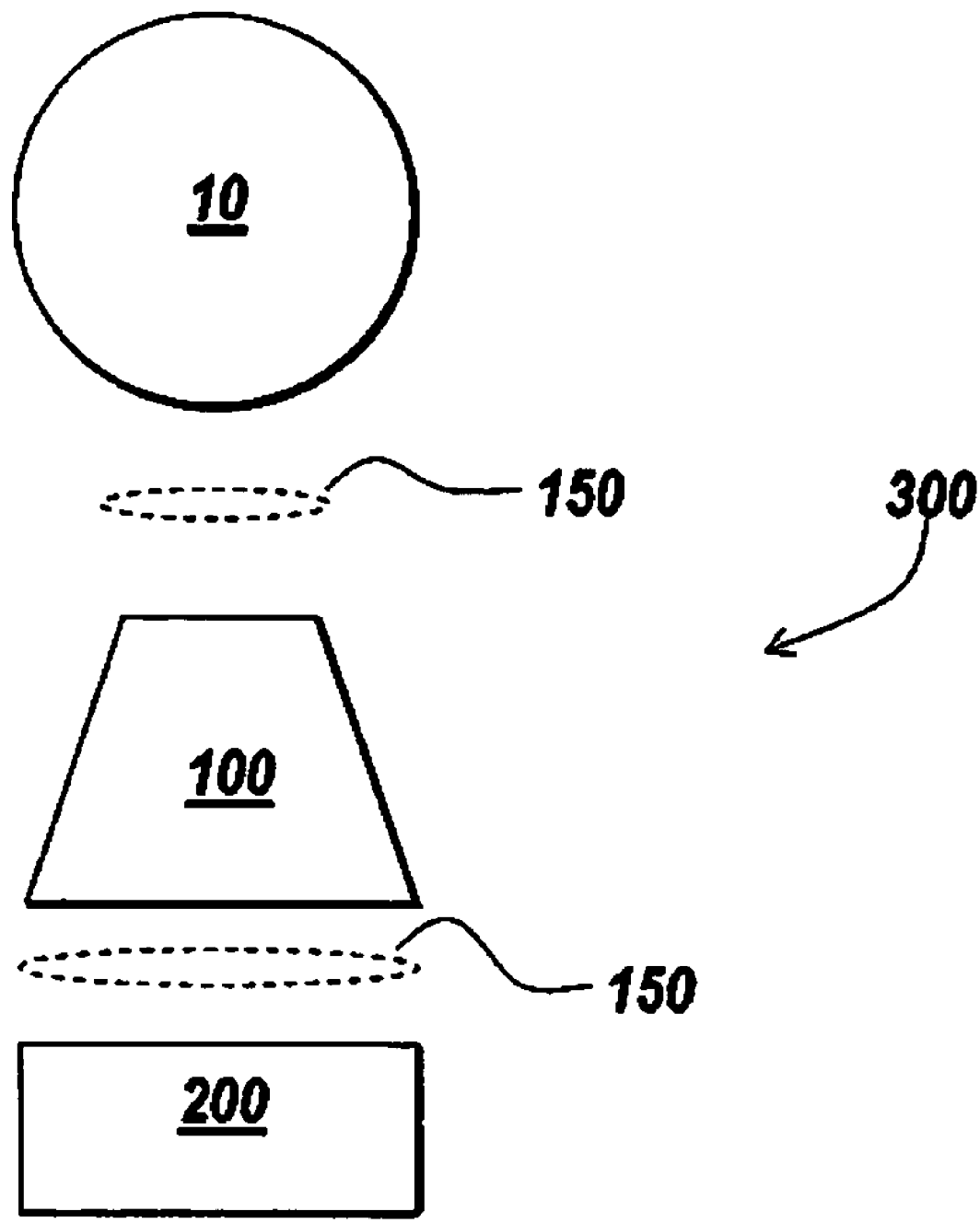
FIG. 1 illustrates a top view of an optical sensor system oriented toward the field of view.

As shown in FIGS. 1 and 2, a gap reduction apparatus 100 is used with an optical sensor 200 in order to obtain an optical image over a field of view 10. The gap reduction apparatus 100 and the optical sensor 200 form an optical sensor system 300. Lenses 150 or other optical elements may optionally be incorporated into the optical sensor system 300. For example one or more lenses 150 may be located between the field of view 10 and the gap reduction apparatus 100 and/or between the gap reduction apparatus 100 and the optical sensor system 300.

As used herein, the term "non-active gap" relates to the separation between sensor elements of one or more optical sensors. Each sensor element of an optical sensor is active in that it is able to optically detect light at the location of the sensor element.

The term "sensor element" relates to a plurality of sensor segments arranged in a group. Examples of sensor elements include, but are not limited to, a linear array of sensor segments, and a matrix sensor, or a subset of sensor segments of a matrix sensor.

The term "segment" relates to any portion, such as a pixel or other identifiable sub-unit, of the sensor elements of the optical sensor 200.

The space between each sensor element is typically caused by manufacturing limitations. This space is non-active in that the optical sensor is not able to detect light at locations between the sensor elements. The present invention serves to minimize the detrimental effects of this non-active gap, while not physically altering the dimensions of the non-active gap. The present apparatus and method are suitable for use with a wide range of non-active gaps.

The apparatus and method may also be used with separate optical sensors, each having one or more sensor elements. In such a case, the method involves directing light from a field of view to each of the multiple sensor elements located on one or more optical sensors and separated by at least one non-active gap.

As shown in FIG. 2, the gap reduction apparatus 100 may be formed of a first fiber optic faceplate 110 and a second fiber optic faceplate 120. The first fiber optic faceplate 110 and a second fiber optic faceplate 120 are optically coupled by optical fibers 130. In one implementation, the optical fibers 130 may be oriented to correspond with sensor elements of an optical sensor 200. The present invention is suitable for use with a wide variety of optical sensors 200.

The gap reduction apparatus 100 serves to orient ends of the optical fibers close together at the first fiber optic faceplate 110. Opposite ends of the optical fibers 130 are then arranged on the second fiber optic faceplate 120 so as to correspond with the sensor elements of the optical sensor 200.

Figure 3:
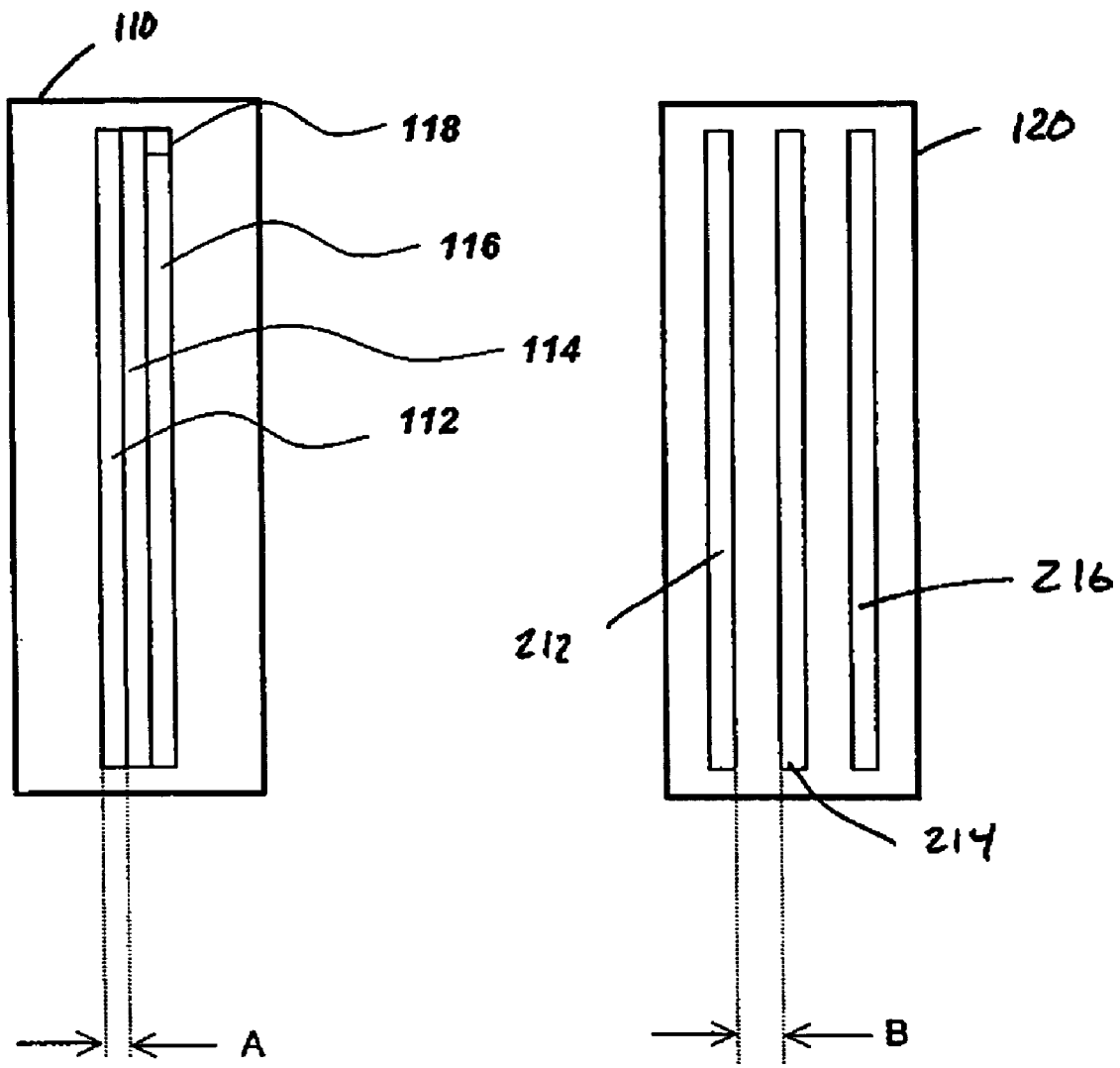
FIGS. 3A & 3B illustrate first and second fiber optic faceplates of a gap reduction apparatus.

FIGS. 3A, 3B, 4 and 5 illustrate the gap reduction apparatus 100 and optical sensor 200. As shown in FIG. 3A, the first fiber optic faceplate 110 is shown having a first element 112, a second element 114 and a third element 116. Each of these elements is formed of segments illustratively shown in the third element 116 by pixel 118.

The first, second and third elements 112, 114, 116 are shown as being located contiguous to each other, thereby minimizing any separation between them. However, the first, second and third elements 112, 114, 116 may be separated from each other by similar or different distances. The ends of the optical fibers 130 that are coupled to the second fiber optic faceplate 120 are further separated from each other than the ends of the optical fiber 130 coupled to the first fiber optic faceplate 110. Therefore, the distance between each of the first, second and third elements 112, 114, 116 is smaller than the non-active gap of an optical sensor optionally interfacing with the second fiber optic faceplate 120. Although the pixels and optical fibers are illustrated herein as square, optical fibers may also be, and typically are, of round or any other arbitrary shape.

Figure 4:
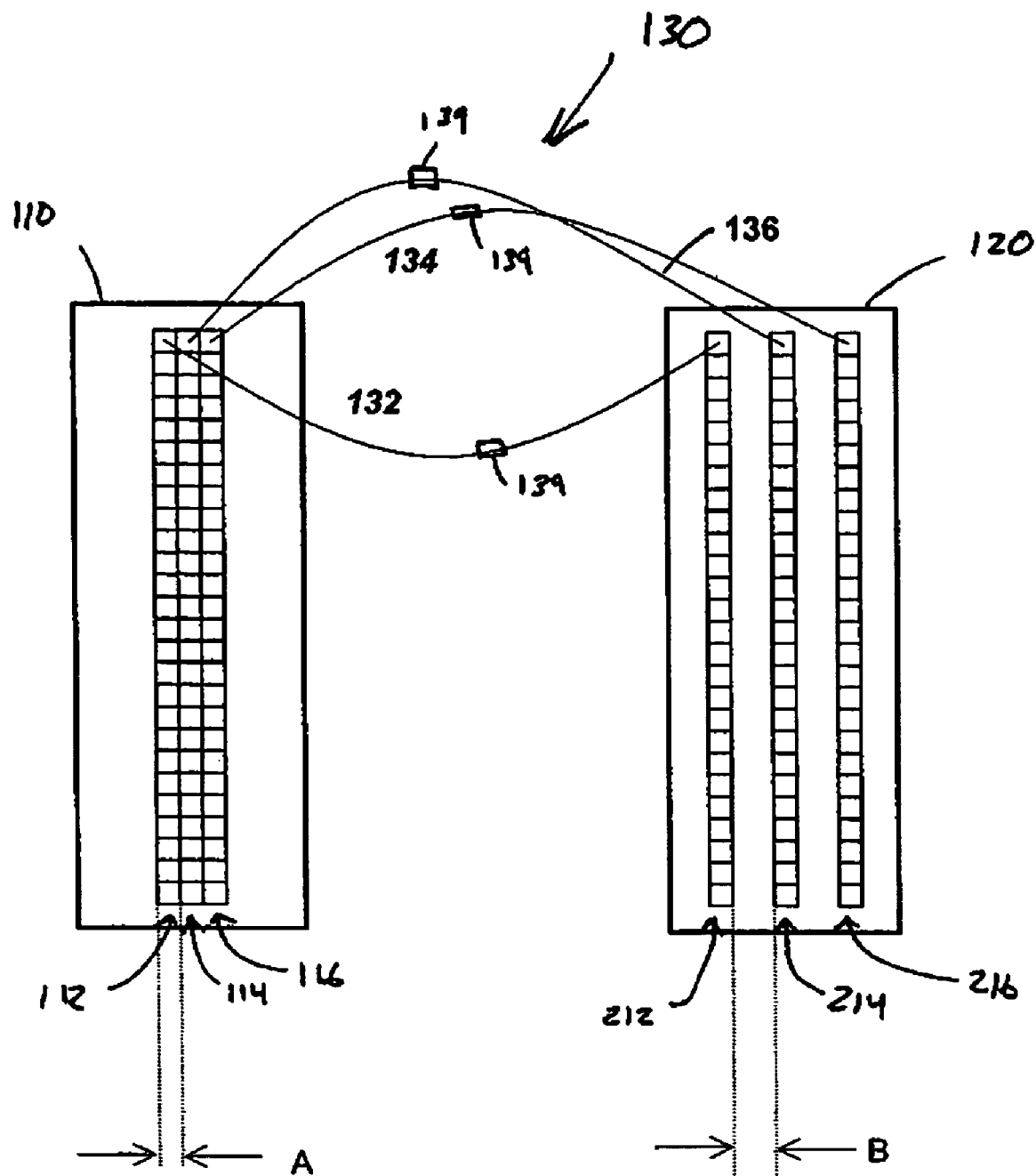
FIG. 4 illustrates sample pixel configurations of the first and second fiber optic faceplates of FIGS. 3A and 3B.

As shown in FIGS. 3A, 3B and 4, distance A represents the width of an optical segment. If distance A is about 14 microns, the overall dimensions of the first fiber optic faceplate 110 are approximately 3 centimeters by 2 centimeters. However, a wide range of dimensions and sizes of optical fibers 130 and faceplates 110 are possible.

The second fiber optic faceplate 120 is illustrated in FIG. 3B. Similar to the first fiber optic faceplate 110, the second fiber optic faceplate 120 has a first element 212, a second element 214 and a third element 216. An average size for distance B is 98 microns. As discussed above, the invention is suitable to a wide range of dimensions.

The overall dimensions of the second fiber optic faceplate 120 may be similar to those of the first fiber optic faceplate 110. The first fiber optic faceplate 110 may be sized so as to be no larger than the arrangement of optical fibers 130 mounted thereon. Considerations involved in sizing the second fiber optic faceplate 120 involve interfacing the second fiber optic faceplate 120 with the optic sensor 200 and specifically, the sensor elements of the optical sensor 200.

FIG. 4 illustrates the optical fibers 130 mounted between the first fiber optic faceplate 110 and the second fiber optic faceplate 120. A first optical fiber 132, a second optical fiber 134 and a third optical fiber 136 are shown for illustrative purposes only as corresponding to the upper-most pixels of the elements of the fiber optic faceplates. Specifically, the first optical fiber 132 is mounted to a first element 112 of the first fiber optic faceplate 110 and the first element 212 of the second fiber optic faceplate 120. Alternatively, the apparatus and method may include coupling different elements among the fiber optic faceplates. For example, the first element 112 of the first fiber optic faceplate 110 may be coupled to the third element 216 of the second fiber optic faceplate 120.

Also, for purposes of illustration, the optical fibers 130 are drawn as corresponding only to the top row of pixels. Each pixel of the first fiber optic faceplate 110 may be optically coupled by the use of an optical fiber 130 to a pixel of the second fiber optic faceplate 120. However, pixels of different rows may be optically coupled to pixels of other rows among fiber optic faceplates. For example, a top pixel of the first element 112 of the first fiber optic faceplate 110 may be coupled to a pixel approximately half way along the length of the second element 214 of the second fiber optic faceplate 120.

Similarly, one or more matrix optical sensors may be used. In such a variation, one or more sensor elements may be formed of segments of one or more matrix sensors.

The optical fibers 130 may be mounted to the fiber optic faceplates 110, 120 by the use of an adhesive, such as glue, or by the use of a grid sized to hold the ends of the optical fibers 130 without the use of an adhesive, such as by the use of a compressive force. A compressive force may be applied by the use of a band, clamp, frame or similar structure.

As noted, color filters may be used in conjunction with the optical fibers 130 so as to limit the colors to a particular sensor element. As illustrated in FIG. 4, color filters 139 are mounted on optical fibers 130 so as to limit the transmission of various colors through the optical fibers 130. A wide variety of other filtering arrangements are also within the scope of the invention. For example, a sheet filter may be coupled to the second fiber optic faceplate 120 and arranged with one of the elements 212, 214, 216 of the second fiber optic faceplate 120. By the use of such color filtering, a black and white optical sensor 200 having multiple sensor elements is capable of producing a color image. Specifically, by using color filters 139, each black and white sensor element 222, 224, 226 is assigned a color. Therefore, by filtering the optical images read by each of the sensor elements and assigning a color to each image based on its associated color filter, such as, for example, red, green or blue, a resulting composite color image can be created, equivalent to an image obtained by a color optical sensor.

The spacing and configuration of the mounting of the optical fibers 130 on the second fiber optic faceplate 120 may be adapted to correspond to the arrangement of the sensor elements 222, 224, 226 on the face 201 of the optical sensor 200. Alternatively, and the apparatus may include optical fibers mounted to the second fiber optic faceplate 120 that do not correspond to a sensor element of the optical sensor. Such additional optical fibers may be ignored by the optical sensor and/or may be used for other signaling or communication purposes.

The second fiber optic faceplate 120 may be securely mounted to the optical sensor 200 by the use of brackets or an adhesive. There is no requirement that the first fiber optic faceplate be securely mounted to either the second fiber optic faceplate or the optical sensor 200, as the optical fibers 130 allow for relative movement of the first fiber optic faceplate 110. Ideally, the first fiber optic faceplate 110 will be securely mounted to a frame that provides a stable orientation toward the field of view 10.

The second fiber optic faceplate 120 may be omitted, allowing direct mounting of the optical fibers 130 to the sensor elements 222, 224, 226 of the optical sensor 200.

Figure 5:
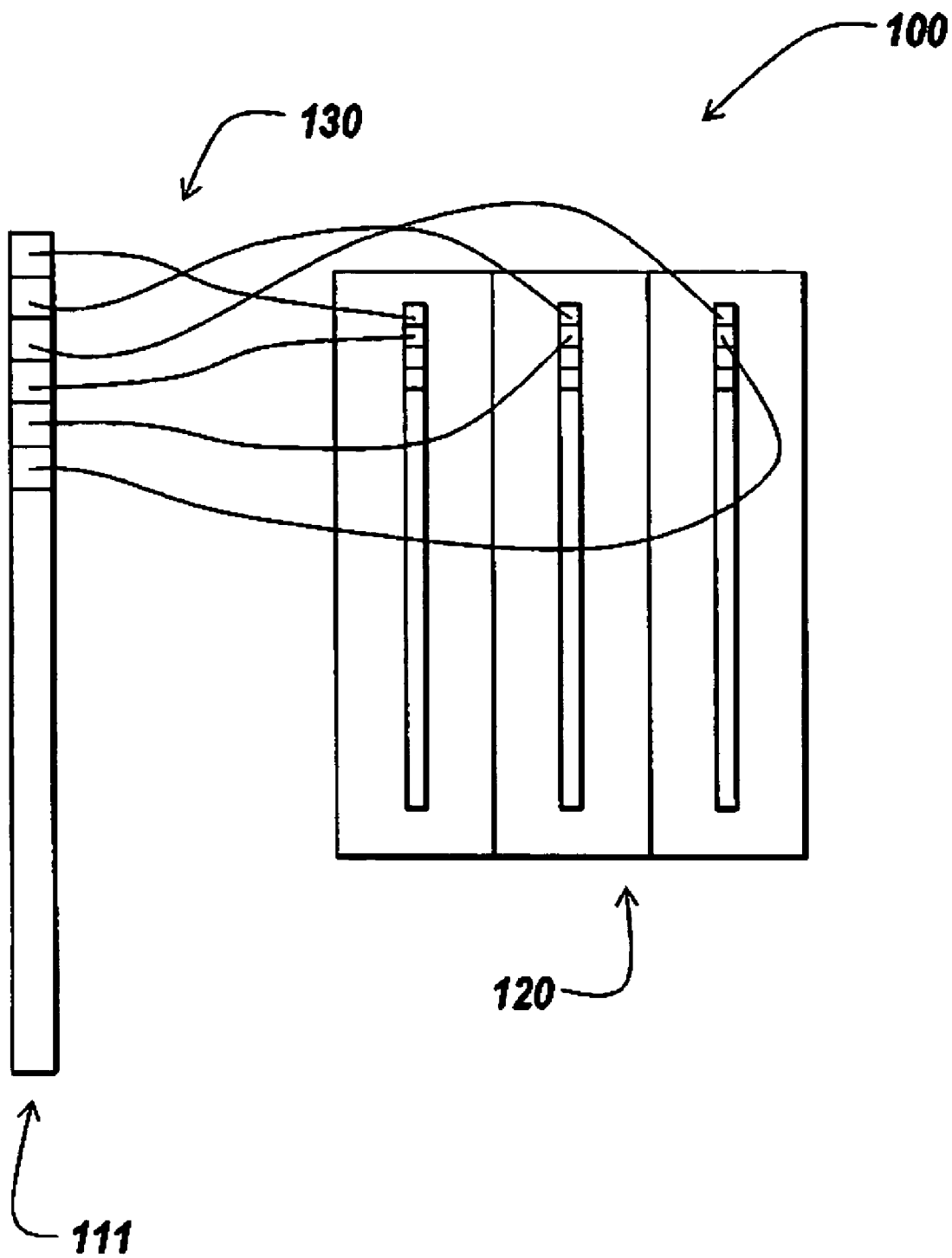
FIG. 5 illustrates a gap reduction apparatus arranging one end of optical fibers in a single column.

FIG. 5 illustrates a gap reduction apparatus 100 having a first fiber optic faceplate 111 used with a second fiber optic faceplate 120, coupled by optical fibers 130. The first fiber optic faceplate 111 arranges the ends of the optical fibers 130 in a single column. The optical fibers 130 may be randomly arranged in a single column or may alternate among each of the columns provided in the second fiber optic faceplate 120. Color filters may also be used as well.

Figure 6:
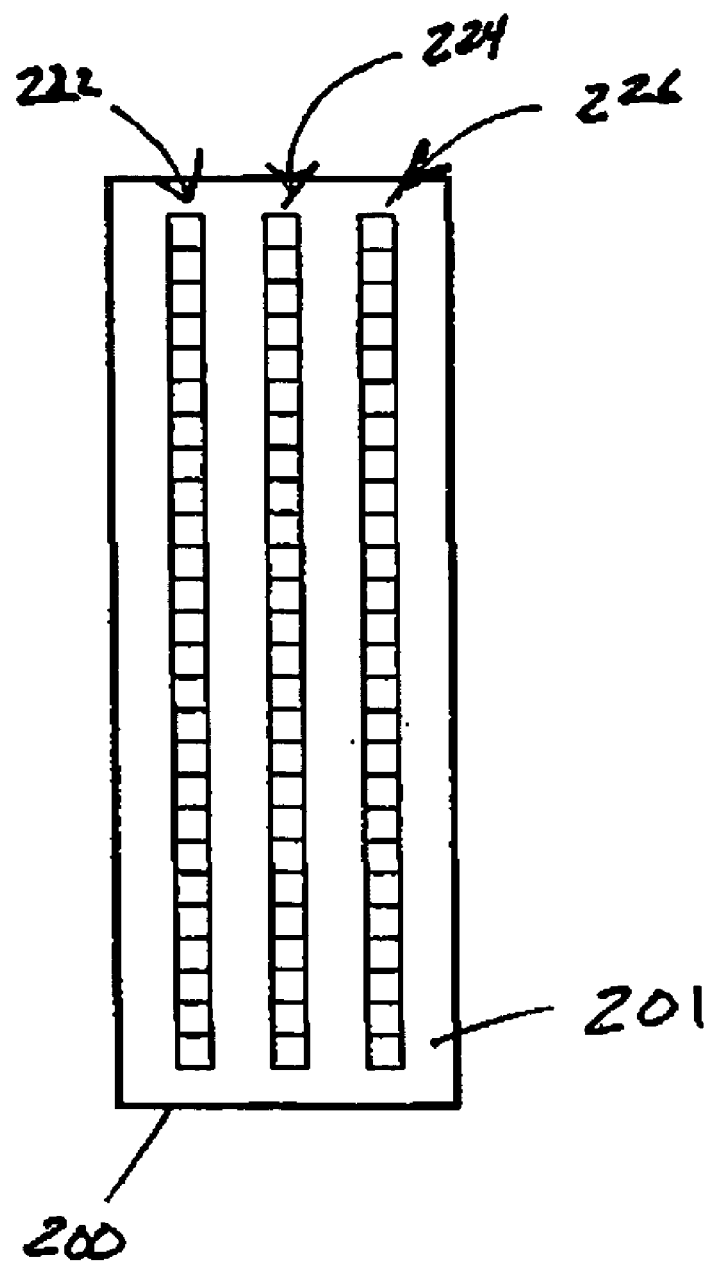
FIG. 6 illustrates an optical sensor.

FIG. 6 illustrates a sample optical sensor 200 having sensor elements arranged linearly. Specifically, a first sensor element 222, a second sensor element 224, and a third sensor element 226 are provided on a face 201 of the optic sensor 200. The optical sensor 200 may be a tri-linear CCD image sensor such as the Kodak 2098×3 Tri-Linear CCD image sensor, model number: KLI-2113, manufactured by Eastman Kodak Company. The optical sensor 200 may be a color optical sensor, a matrix sensor and/or may be black and white.

Figure 7:
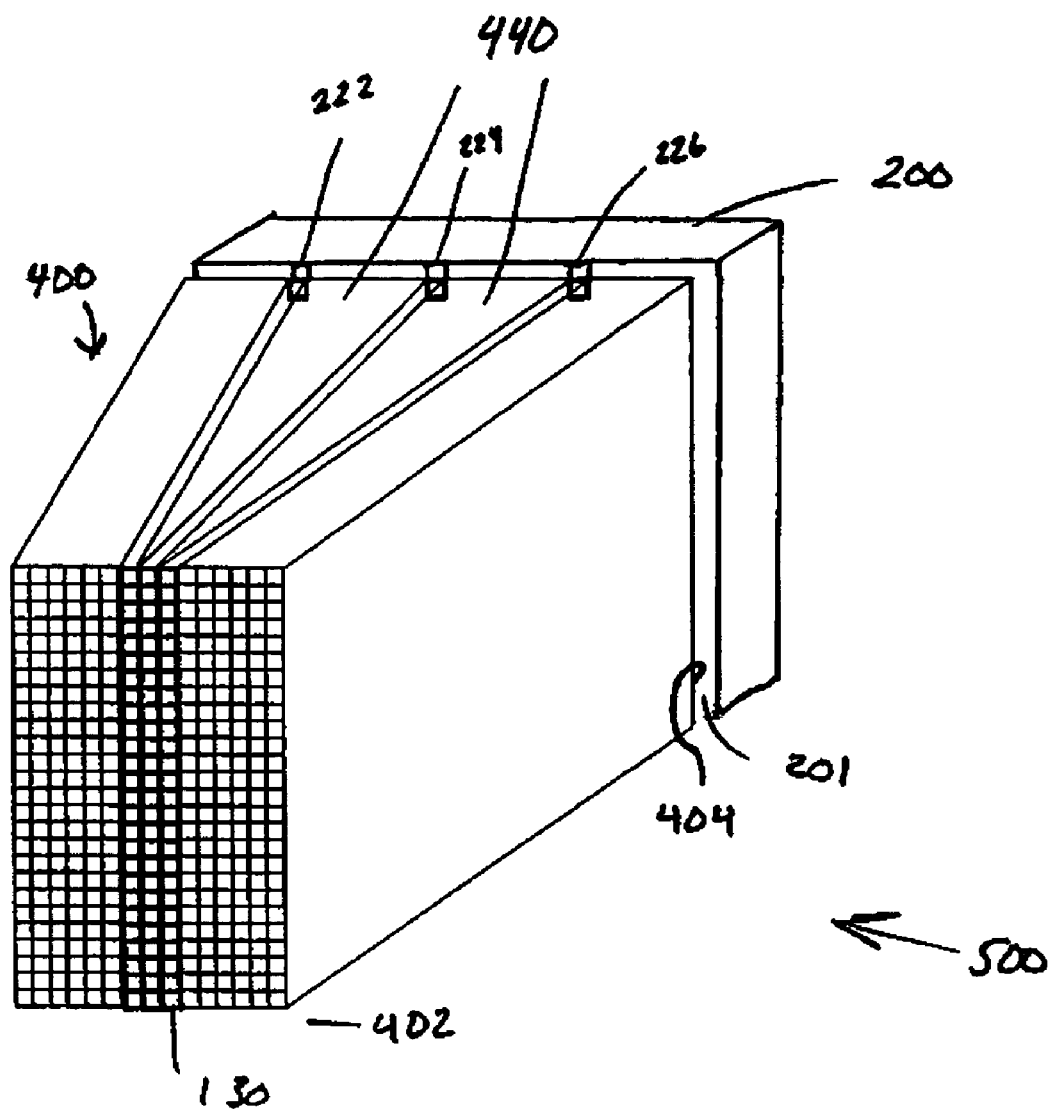
FIG. 7 illustrates an optical sensor system having a gap reduction apparatus according to an alternative embodiment of the present invention.

The apparatus may also use at least one spacer. An optical sensor system 500, as illustrated in FIG. 7, includes a gap reduction apparatus 400 in a block structure formed by the use of spacers 440 to arrange optical fibers 130 to correspond to sensor elements 222, 224, 226 of optical sensor 200, as discussed above. At an opposite end of optical fibers 130, the optical fibers are ideally arranged proximate to each so as to minimize a separation between them, thereby minimizing the separation of the optical image obtained. Although spacers 440 are illustrated in FIG. 7 as wedges extending along the length the optical fibers 130, this is not necessary. Specifically, spacers 440 may be used only at the end of the optical fiber approximate to the optical sensor 200. Furthermore, the spacers 440 may be in a variety of shapes, such a rectangular block, a square block, an oval or any other arbitrary shape able to separate optical fibers. Spacers may be formed of a wide variety of materials, including, but not limited to the following: plastics, glass, metals, composites, paper or other wood products.

The gap reduction apparatus 400 of FIG. 7 may be formed so as to arrange one end of the optical fibers in a single column as illustrated with respect to the first fiber optic faceplate 111 of FIG. 5.

The gap reduction apparatus 400 may use adhesive to mount the optical fibers 130 to each other at a side 402 distant from the optical sensor 200 and to mount the optical fibers 130 to the one or more spacers 440 and to each other at a side 404 approximately to the optical sensor 200. Alternatively, other forms of mounting optical fibers 130 to each other and/or to the spacers 440 may be used to form a block structure. Examples include a band or frame surrounding at least one end of the gap reduction apparatus 400 or a compressive wrapping arranged to maintain the configuration of the sides 402, 404 of the gap reduction apparatus. Another example involves fusing of the optical fibers 130 to each other.

Figure 8:
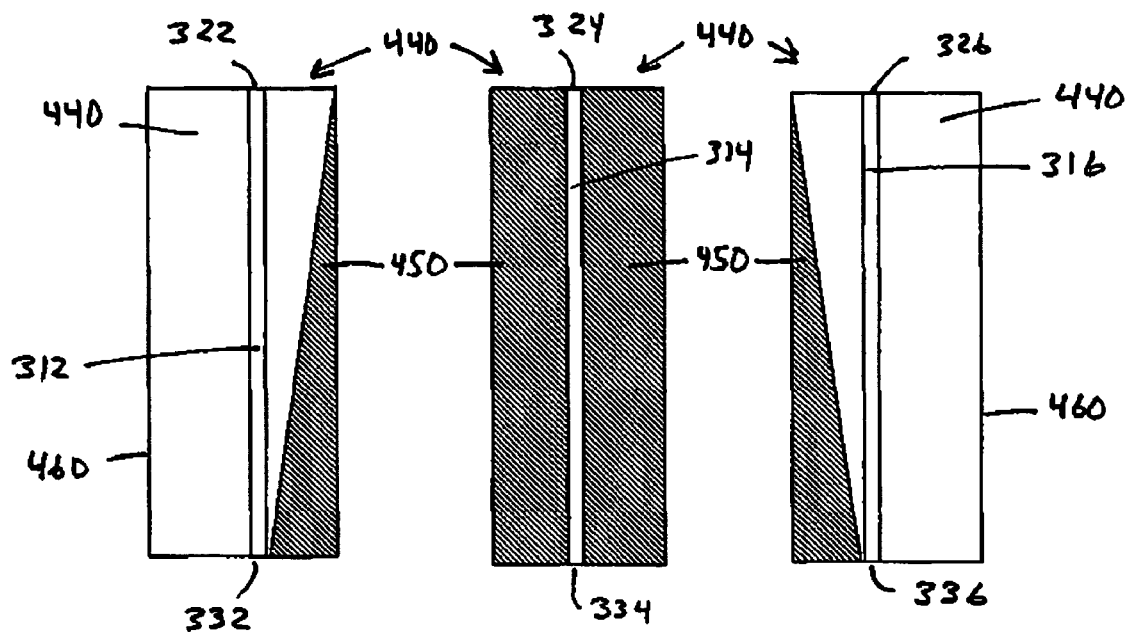
FIGS. 8 and 9 illustrate example manufacturing steps that may be used for the construction of the gap reduction apparatus of FIG. 7.
Figure 9:
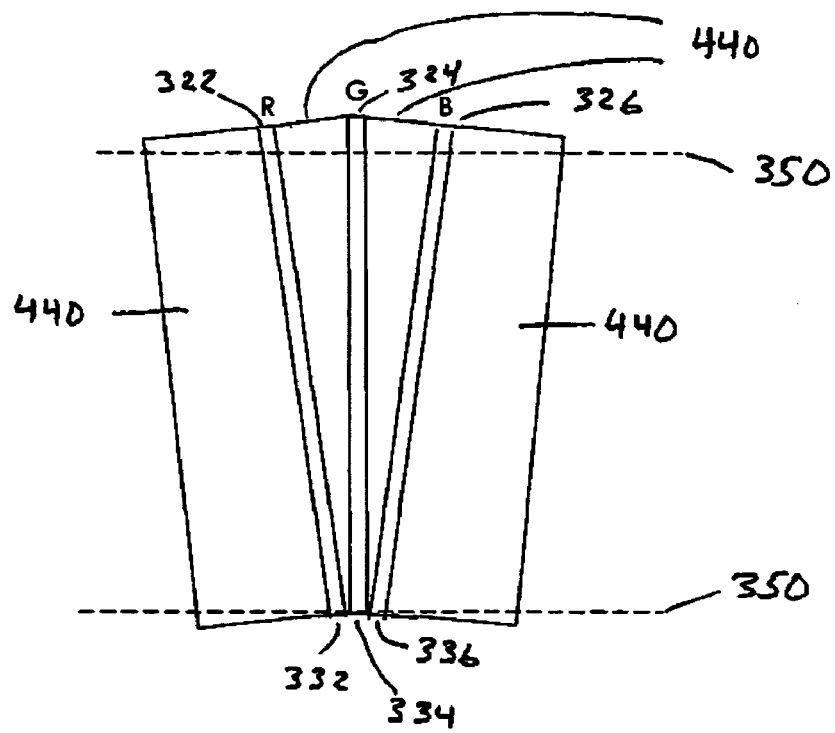

One example of construction of the gap reduction apparatus 400 of FIG. 7 is illustrated by way of example in FIGS. 8 and 9. As shown in FIG. 8, the spacers 440 are mounted to optical elements 312, 314, 316. According to various implementations, the spacers are mounted with the optical elements 312, 314, 316 by fusing and/or injection molding manufacture techniques. The spacers 440 are then ground down in the grinding areas 450 to shape the spacers 440 to position a first element 312, a second element 314 and a third element 316. The spacers 440 form components that may be assembled as shown in FIG. 9 such that a first end 322, 324, 326 of the elements 312, 314, 316 may be aligned with elements of an optical sensor and a second end 332, 334, 336 of the elements 312, 314, 316 may be oriented toward a field of view, such as, for example, a focal plane. Optionally, a mirrored surface 460 may be provided along outer side surfaces to inhibit the entry of light through the outer side surfaces.

The gap reduction apparatus 400 of FIG. 9 may be coupled together by the use of epoxy or heat treatment and optionally may be ground down along the dashed lines 350 to conform to the dimensions of an optical sensor or other optical components used in conjunction with the gap reduction apparatus 400.

It is understood that embodiments of the invention may be implemented in a wide variety of scales, such as by using large optical fibers or by the use of nanotechnology manufacturing techniques. According to one implementation, optical fibers of 14 microns in diameter are used. In another implementation, 5 micron diameter fibers are used.

These examples are meant to be illustrative and not limiting. The present invention has been described by way of example, and modifications of the exemplary embodiments, implementations and variations will suggest themselves to skilled artisans in this field without departing from the spirit of the invention. Aspects and characteristics of the above-described embodiments, implementations and variations may be used in combination. The scope of the invention is to be measured by the appended claims, rather than the preceding description, and all variations and equivalents that fall within the range of the claims are intended to be embraced therein.

What is claimed is:

1. An optical sensor apparatus for effectively reducing a non-active gap, comprising:
    an optical sensor having a first linear array of sensor segments and a second linear array of sensor segments separated by a first non-active gap having a first width;
    a first optical fiber having a first end oriented toward a field of view and a second end oriented toward a sensor segment of said first linear array of sensor segments, for directing first image information from said field of view to said first linear array; and
    a second optical fiber for directing second image information from said field of view to said second linear array, said second optical fiber having a first end oriented toward said field of view and located a first distance, less than said first width, from said first end of said first optical fiber and a second end oriented toward a sensor segment of said second linear array of sensor segments and located a second distance, greater than said first distance, from said second end of said first optical fiber, thereby providing optical congruence between said field of view and said first and second image information without substantial time delay.

2. The optical sensor apparatus of claim 1, wherein said optical sensor has a third linear array of sensor segments separated from said second linear array of sensor segments by a second non-active gap having a second width, said optical sensor apparatus further comprising:
    a third optical fiber having a first end oriented toward said field of view and located a third distance, less than said second width, from said first end of said second optical fiber and a second end oriented toward a sensor segment of said third linear array of sensor segments, for directing third image information from said field of view to said third linear array.

3. The optical sensor apparatus of claim 2, further comprising:
    a first color filter positioned to filter light reaching said first linear array of sensor segments;
    a second color filter, different from said first color filter, positioned to filter light reaching said second linear array of sensor segments;
    a third color filter, different from said first color filter and said second color filter, positioned to filter light reaching said third linear array of sensor segments.

4. The optical sensor apparatus of claim 2, further comprising a first fiber optic faceplate configured to accommodate said first end of said first optical fiber and said first end of said second optical fiber.

5. The optical sensor apparatus of claim 1, wherein said first ends of said first and second optical fibers are arranged in a single column.

6. The optical sensor apparatus of claim 1, wherein said optical fibers are mounted within a block structure.

7. The optical sensor apparatus of claim 1, wherein said field of view is along a plane intersecting said first end of said first optical fiber and said first end of said second optical fiber.

8. The optical sensor apparatus of claim 1, wherein said optical sensor is a linear sensor.

9. The optical sensor apparatus of claim 1, wherein said optical sensor is a tri-linear sensor having three sensor elements.

10. The optical sensor apparatus of claim 1, wherein said optical sensor is at least one matrix sensor.

11. The optical sensor apparatus of claim 1, wherein said optical sensor comprises at least one linear array formed on a matrix sensor.

12. The optical sensor apparatus of claim 1, wherein said optical sensor comprises three linear arrays formed on a matrix sensor.

13. The optical sensor apparatus of claim 1, wherein said second end of said first optical fiber is mounted to said sensor segment of said first linear array of sensor segments and said second end of said second optical fiber is mounted to said sensor segment of said second linear array of sensor segments.

14. The optical sensor apparatus of claim 1, further comprising at least one lens, located between said field of view and said first ends of said first optical fiber and said second optical fiber.

15. An optical sensor apparatus for effectively reducing a non-active gap, comprising:
a tri-linear optical sensor having a first linear sensor element and a second linear sensor element separated by a first non-active gap having a first width and a third linear sensor element separated from said second linear sensor element by a second non-active gap having a second width;
a first optical fiber having a first end oriented toward a field of view and a second end oriented toward a sensor segment of said first linear sensor element, for directing first image information from said field of view to said sensor segment of said first linear sensor element;
a second optical fiber having a first end oriented toward said field of view and located a first distance, less than said first width, from said first end of said first optical fiber and a second end oriented toward a sensor segment of said second linear sensor element and located a second distance, greater than said first distance, from said second end of said first optical fiber, said second optical fiber directing second image information from said field of view to said sensor segment of said second linear sensor element; and
a third optical fiber having a first end oriented toward said field of view and located a third distance, less than said second width, from said first end of said second optical fiber and a second end oriented toward a sensor segment of said third linear sensor element and located a fourth distance, greater than said third distance, from said second end of said second optical fiber, said third optical fiber directing third image information from said field of view to said sensor segment of said third linear array; thereby providing optical congruence between said field of view and said first, second and third image information without substantial time delay.

16. The optical sensor apparatus of claim 15, wherein said first optical fiber includes a plurality of first optical fibers and said second optical fiber includes a plurality of second optical fibers and said third optical fiber includes a plurality of third optical fibers.

17. The optical sensor apparatus of claim 15, wherein said first ends of said first, second and third optical fibers are arranged in a single column.

18. The optical sensor apparatus of claim 15, wherein said second end of said first optical fiber is mounted to said sensor segment of said first linear sensor element, said second end of said second optical fiber is mounted to said sensor segment of said second linear sensor element and said second end of said third optical fiber is mounted to said sensor segment of said third linear sensor element.

19. An apparatus for effectively reducing a non-active gap of an optical sensor, comprising:
a first fiber optic faceplate oriented toward a field of view and configured to accommodate a plurality of optical fibers;
a second fiber optic faceplate oriented toward an optical sensor and configured to accommodate said plurality of optical fibers;
a first optical fiber of said plurality of optical fibers having a first end mounted to said first fiber optic faceplate and a second end mounted to said second fiber optic faceplate; and
a second optical fiber of said plurality of optical fibers having a first end mounted to said first fiber optic faceplate a first distance, less than said non-active gap, from said first optical fiber and said second optical fiber having a second end mounted to said second fiber optic faceplate a second distance, greater than said first distance, from said first optical fiber such that said second end of said first optical fiber and said second end of said second optical fiber are spaced to (a) align with, and (b) direct first and second image information from said field of view to, a first linear array and a second linear array, respectively, of said optical sensor;
wherein said spacing of said second ends of said first and second optical fibers provides optical congruence between said field of view and said first and second image information without substantial time delay.

20. The apparatus of claim 19, wherein said plurality of optical fibers includes a plurality of said first optical fibers and a plurality of said second optical fibers.

21. The apparatus of claim 19, further comprising a third optical fiber of said plurality of optical fibers having a first end mounted to said first fiber optic faceplate a distance from said first end of said second optical fiber less than said non-active gap, a second end mounted to said second fiber optic faceplate such that said second end of said third optical fiber is located to align with a third linear array of said optical sensor, to direct third image information from said field of view to said third linear array.

22. The apparatus of claim 21, wherein said first ends of said first, second and third optical fibers are arranged in a single column.

23. The apparatus of claim 19, wherein said first ends of said first optical fiber and said second optical fiber are mounted normal to a plane formed by said first fiber optic faceplate and said second ends of said first optical fiber and said second optical fiber are mounted normal to a plane formed by said second fiber optic faceplate.

24. The apparatus of claim 19, further comprising said optical sensor mounted to said second fiber optic faceplate.

25. The apparatus of claim 24, wherein said optical sensor is a tri-linear CCD image sensor.

26. The apparatus of claim 24, wherein said optical sensor is at least one matrix sensor.

27. The apparatus of claim 24, wherein said optical sensor comprises at least one linear array formed on a matrix sensor.

28. The apparatus of claim 19, further comprising a plurality of color filters used with said plurality of optical fibers so as to separate colors provided to said arrays of said optical sensor.

29. An apparatus for effectively reducing a non-active gap of an optical sensor, comprising:
  a first optical fiber and a second optical fiber mounted to each other such that a first end of said first optical fiber and a first end of said second optical fiber are oriented toward a field of view; and
  a first spacer mounted between a second end of said first optical fiber and a second end of said second optical fiber for locating said second end of said first optical fiber and said second end of said second optical fiber further apart than said first end of said first optical fiber and said first end of said second optical fiber, to correspond to elements of an optical sensor and to provide optical congruence between said field of view and image information directed from said field of view to said elements via said first and second optical fibers, without substantial time delay.

30. The apparatus of claim 29, further comprising:
  a second spacer; and
  a third optical fiber for directing image information from said field of view to said elements of an optical sensor, said third optical fiber having a first end oriented toward said field of view and a second end located such that said second end of said third optical fiber and said second end of said second optical fiber are further apart than said first end of said third optical fiber and said first end of said second optical fiber and to correspond to said elements;
  wherein said optical sensor is a tri-linear optical sensor.

31. The apparatus of claim 30, wherein said first ends of said first second and third optical fibers are arranged in a single column.

32. The apparatus of claim 29, further comprising a plurality of color filters used with said optical fibers so as to separate colors provided to said elements of said optical sensor.

33. The apparatus of claim 24, wherein said optical sensor is a tri-linear CCD image sensor.

34. The apparatus of claim 19, wherein said optical sensor is at least one matrix sensor.

35. The apparatus of claim 19, wherein said optical sensor comprises at least one linear array formed on a matrix sensor.

36. A method of effectively reducing a non-active gap of an optical sensor, comprising the steps of:
  providing an optical sensor having a first linear sensor element and a second linear sensor element separated by a first non-active gap having a first width and a third linear sensor element separated from said second linear sensor element by a second non-active gap having a second width;
  orienting a first end of a first optical fiber toward a field of view; orienting a second end of said first optical fiber toward said first linear sensor element;
  locating a first end of a second optical fiber a first distance, less than said first width, from said first end of said first optical fiber and oriented toward said field of view;
  orienting a second end of said second optical fiber toward said second linear sensor element and at a second distance, greater than said first distance, from said second end of said first optical fiber;
  locating a first end of a third optical fiber a third distance, less than said second width, from said first end of said second optical fiber and oriented toward said field of view;
  orienting a second end of said third optical fiber toward said third linear sensor element and at a fourth distance, greater than said third distance, from said second end of said second optical fiber;
  wherein said first, second and third optical fibers direct image information, from said field of view to said first, second and third sensor elements, respectively, thereby providing optical congruence between said field of view and said image information, without substantial time delay.

37. The method of claim 36, further comprising the step of providing a plurality of color filters used with said optical fibers so as to separate colors provided to said elements of said optical sensor.

38. The method of claim 36, wherein said optical sensor is a tri-linear CCD image sensor.

39. The method of claim 36, wherein said optical sensor is at least one matrix sensor.

40. The method of claim 36, wherein said optical sensor comprises at least one linear array formed on a matrix sensor.

41. The optical sensor apparatus of claim 36, wherein said second end of said first optical fiber is mounted to said first linear sensor element, said second end of said second optical fiber is mounted to said second linear sensor element and said second end of said third optical fiber is mounted to said third linear sensor element.

42. An apparatus for effectively reducing a non-active gap of an optical sensor, comprising:
  means for obtaining optical information from a field of view; and
  means for orienting said optical information to at least two linear sensor elements of at least one optical sensor so as to enhance an optical congruence capability of said optical sensor.

43. The apparatus of claim 42, further comprising means for positioning said means for obtaining in relation to said optical sensor.

* * * * *